United States Patent Office 3,043,969
Patented July 10, 1962

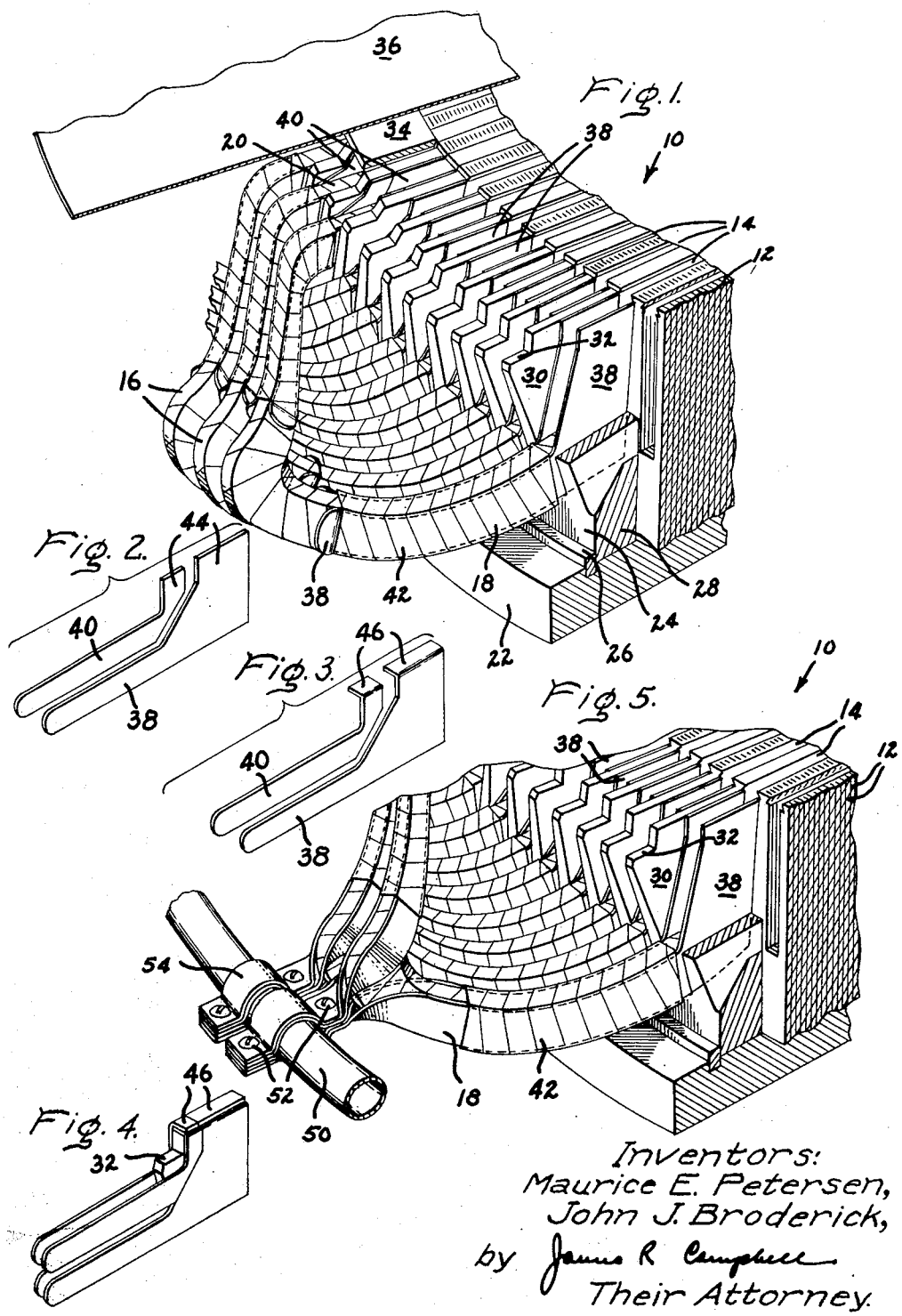
Inventors:
Maurice E. Petersen,
John J. Broderick,
by James R. Campbell
Their Attorney.

3,043,969
ARRANGEMENT FOR COOLING
COIL END TURNS
Maurice E. Petersen and John J. Broderick, Schenectady,
N.Y., assignors to General Electric Company, a corporation of New York
Filed Nov. 3, 1958, Ser. No. 771,474
6 Claims. (Cl. 310—64)

The invention described herein relates to dynamoelectric machines and more particularly to an improved arrangement for removing heat from coil end turns of canned motors intended for use with high pressure pumps.

The past need for a motor capable of operating in liquid or gaseous atmospheres of high pressure resulted in the development of the canned motor which generally consists of a squirrel cage rotor enclosed in a metal cylindrical envelope and a stator having a like envelope firmly positioned on its inner peripheral surface. The disposition of the envelopes and other parts are such that the rotor and stator elements are hermetically sealed and spaced from each other to provide the motor air gap for the machine. This type of machine has found successful use in both liquid and gaseous environments and the improvement of this invention is directed to the type of canned motor having an attached pump used in circulating water in the neighborhood of 2,000 p.s.i. and 500° F. In the specific canned motor, water is circulated through the air gap in a system separate from the main system which includes the pump. The water flowing through the air gap is at a lower temperature than the water in the main system, but the pressure of the latter is permitted to be reflected in the air gap by the small openings at the pump end of the motor. Since the windings are hermetically sealed and therefore positioned within a dead air space, it is difficult to effect transfer of heat from the windings to the circulating water and this factor plays an important part in determining the size of the motor that can be made and used effectively.

Various constructions have been proposed for removing heat from the end turns such as circulating water and air in heat exchange relationship with the coil end turns. Submerging the end turns in oil has been suggested. These prior art means of cooling are generally undesirable because any leakage of oil from the cooling system finds its way into the main pump circulating system. Water attacks the insulation and although motors having insulation resistant to attack by water are now in use, such insulation systems will not withstand high temperatures in the 500° F. region. Air circulating equipment is bulky and expensive and is not a satisfactory solution to the problem of removing heat from the end turns. Copper blocks of high thermal conductivity have been proposed for placement between the end turns and the inner or outer casing of the motor, but these are subject to the disadvantage of being displaced when the end turns are physically moved as a result of interacting magnetic forces when the coils are subjected to load currents. Such displacement of the copper blocks interrupts or breaks the thermal circuit intended to be maintained between the end turns and a zone of lower temperature. Moreover, an oxide coating forms on the copper blocks which ultimately provides a barrier or insulation effective in minimizing transfer of heat from the blocks to the stator frame or other parts at a lower temperature. Since the coils also are placed in a dead air space the transfer of heat by convection is negligible and reliance therefore must be placed totally on transfer by radiation and conduction.

The object of our invention therefore is to overcome the above disadvantages of the prior art by providing a construction capable of maintaining continuity of heat flow between the end turns and the cylindrical stator can which is cooled by water flowing in heat exchange relationship therewith.

Another object of our invention is to provide a heat conductive member in intimate contact with the coil end turns and parts thermally connected with the cylindrical can for forming a low resistance path to the flow of heat.

In carrying out our invention, we provide a plurality of thin copper strips shaped to the configuration of the sides of the insulated coil end turns. These strips are fastened along the length of the end turns by glass tape and terminate in members of large surface areas which are placed in firm contact with flange shaped fingers provided on a ring abutting the stator punchings. A backup plate consisting of a cylindrical ring is placed between and in intimate contact with the flange shaped fingers and the cylindrical can, thereby providing for transfer of heat from the copper strips and the fingers to the water circulated across the exposed inner surface of the can. Because of the high thermal conductivity of the parts, a low resistance path to the axial and radial flow of heat is established to permit the effective cooling of the end turns by conducting the heat therein to a zone of lower temperature where it is transferred to a liquid medium circulated in a cooling system.

While the specification concludes with claims particularly pointing out and distinctly claiming the subject matter which we regard as our invention, it is believed the invention will be better understood from the following description taken in connection with the accompanying drawing in which:

FIGURE 1 is a perspective view, partly in section, of a portion of one end of a canned motor illustrating the disposition of copper strips used for removing heat from the end turns;

FIGURE 2 is a perspective view of copper strips adapted for attachment to the end turns;

FIGURE 3 is a modification of the strips shown in FIGURE 2;

FIGURE 4 illustrates how the copper strips of FIGURE 3 are attached to the flange shaped fingers adjacent the stator; and FIGURE 5 illustrates another modification of the invention.

Referring now to the drawing wherein like reference characters designate like or corresponding parts throughout the several views, there is shown in FIGURES 1 and 5, a portion of a canned motor consisting of a stator 10 comprising a plurality of laminations 12 having conductor slots 14 therein. Insulated form wound coils 16 have one portion 18 appearing in the outer side of one slot while the other portion 20 is reversely bent for positioning in an inner side and in a manner well known in the art. The stator is enclosed within a steel shell 22 and is held firmly in place by a cylindrical ring 24 secured in position by a retaining member 26. The ring 24 comprises a solid portion 28 of thick material having upstanding plates or fingers 30 all terminating short of the inner diameter of the stator. As illustrated in FIGURE 1, the plates extend axially of the stator core and form a circular shoulder 32 which receives an additional structural member, not shown, for enclosing the coil end turns. A backup plate 34 having an inner diameter equal to that of the stator, is positioned on the flat portions of the fingers for effectively extending the stator length and thereby providing the necessary structural support to a cylindrical stainless steel can 36 which is firmly positioned within the stator core. Since the air gap is subjected to pressures in the neighborhood of 2,000 p.s.i., the can which is approximately .020 inch in thickness, must be provided with firm mechanical support to protect it from the large forces exerted thereon by the pressures existing in the air gap.

According to this invention, copper strips 38 and 40, or other material having an equivalent high thermal conductivity are attached to the end turns by means of glass cloth 42 or other non-conducting substances. Since the opposite sides of the end turns are placed at different distances from the inner surface of the stator, the copper strips accordingly must be made of different sizes, as indicated in FIGURE 2. Those sides of the coil appearing in the outermost portion of the conductor slots obviously will be of greater size than those appearing in the inner side of the slot. The two copper strips shown in FIGURE 2 are respectively used for these purposes.

When the copper strips are taped in position, the portions 44 are fixed in intimate thermal contact with the sides of the plates 30 and are secured thereto by any means that will provide a firm heat exchange between the parts, such as welding, brazing, using wedges having a thickness equal substantially to the distance between adjacent plates, or any other device capable of carrying out this function. The use of the copper strips 38 and 40 therefore provide an alternate way of transferring heat from the end turns to the plates 30, backup plate 34, can 36 and the water that is circulated in contact with it. Heat also flows through the main body of the coil to the stator core which comprises a heat sink for transferring the heat to the can and water. It therefore will be seen that the heat flows in an axial direction from the end turns towards the stator prior to changing its direction to flow radially inwardly to the can.

In the modification shown in FIGURE 3, the copper strips 38 and 40 are modified to the extent of adding an additional portion 46 to the main body of the strip. As viewed in FIGURE 4, when the copper strips are applied to the end turns and positioned on opposite sides of the plates 30, the portions 46 are adapted to be turned over and thereby provide a more direct way of transferring heat from the coil end turns to the backup plate 34 and can 36. Obviously, the function of the strips 38 and 40 is to carry heat from the end turns which are disposed in a dead air space to the areas of lesser temperature. This function can be performed in any one of a number of different ways as for example, using heat conductive cloth of high thermal conductivity in lieu of the glass tape. Also, copper or other high thermal conductivity material can be sprayed onto the end turns for carrying out this function. It also will be evident that in those instances where it is desirable to eliminate the ring with its attached fingers, the strips can be extended into the conductor slots to effect transfer of heat from the end turns. Alternatively, the strips could be secured directly to the inner side of the outer frame extending over the end turns. In the latter case, it would be desirable to carry away the heat by a heat exchanger attached to the outer surface of the frame.

The modification illustrated in FIGURE 5 is substantially the same as that previously disclosed except that the end turns are equipped with straps which are anchored to a tube 50 by means of bolts 52 or other securing means. In the embodiment shown, the copper straps which are of a size and configuration such as that shown at 38 or 40 in FIGURE 3, conform to the end turns and are secured thereto by insulation 42 and terminate at their free ends on the tube 50 which has a heat exchange medium circulated thereto. Both the full and dotted lines indicate how the straps are bent outwardly for attachment to the tube 50. In this arrangement, heat is transferred from the main body of the coil end turns to the straps 54 firmly attached to the tube 50. A coolant, such as water, is circulated through the tube to carry away heat imparted thereto by the end turns. Although a specific clamping arrangement is illustrated in FIGURE 5, it will be evident that many other different clamping or securing arrangements can be resorted to without departing from the inventive concept.

Obviously, many modifications and variations are possible in light of the above teachings. It therefore is to be understood that within the scope of the appended claims, the invention may be practiced otherwise than as specifically described.

What we claim as new and desire to secure by Letters Patent of the United States is:

1. A stator core for a dynamoelectric machine comprising a pluraliy of stacked laminations including conductor slots having coils therein, means fitted in contact with opposite ends of said stacked laminations and in axial alignment therewith for holding the core under pressure, a cylindrical can mounted in the bore of the stator and in heat exchange relationship with the core and said means, a heat conducting element on each of the end turns of said coils and having a portion thereof affixed to said means for providing a low resistance path for flow of heat from the end turns to both the can and said laminations.

2. A stator core for a dynamoelectric machine comprising a plurality of laminations including conductor slots having coils therein, a ring in contact with the laminations and a cylindrical can fitted in heat exchange relationship with the bore of the laminations and the ring, said ring comprising a body portion fixed in contact with a steel shell supporting the laminations, inwardly projecting elements extending from the body portion and terminating flush with the inner peripheral surface of the laminations, a heat conducting element of high thermal conductivity shaped to the configuration of the end turns and extending throughout a major portion of the end turn length, means securing said element in thermal contact with the coil end turns and the inwardly projecting elements on said ring for providing a low resistance path for the flow of heat axially from the end turns to the ring for transfer to said can.

3. A stator core for use in a dynamoelectric machine comprising a plurality of laminations including conductor slots having coils therein, a cylindrical ring having spaced fingers for receiving the end turns of said coils positioned to abut said laminations, a cylindrical can fitted in heat exchange relationship with the bore of the stator and said ring, heat conductive copper strips affixed on opposite sides of each of said end turns and terminating in full surface contact with said ring fingers for providing a path of low resistance for the flow of heat axially from the end turns to said can.

4. The combination according to claim 3 wherein the strips of copper are shaped to the configuration of the end turns and the ring fingers.

5. The combination according to claim 3 wherein said copper strips are bent over the upper surface of said fingers for providing direct contact with said can fitted in the stator bore.

6. A stator core for use in a dynamoelectric machine comprising a plurality of laminations including conductor slots having coils therein, means holding the laminations together to form the stator core, a cylindrical can fitted in heat exchange relationship with the bore of the stator core, heat conductive copper strips affixed to each of said end turns and placed in full surface contact with insulation disposed thereon, a tube formed into a circle of a diameter substantially the same as the diameter of the stator core end turns and positioned axially outward therefrom, each of said strips having an end shaped to the configuration of said tube and extending outwardly from the end turns, means securing said strips to said tube so that when the stator core is placed in operation, heat generated in the end turns is transmitted through said strips to said tube which is adapted to contain a heat exchange fluid for carrying heat away from the machine.

References Cited in the file of this patent

UNITED STATES PATENTS

| | | |
|---|---|---|
| 975,477 | Storer | Nov. 5, 1910 |
| 1,969,493 | Ansingh | Aug. 7, 1934 |
| 2,727,164 | Radice | Dec. 13, 1955 |
| 2,824,983 | Cametti | Feb. 25, 1958 |

FOREIGN PATENTS

| | | |
|---|---|---|
| 19,599 | Great Britain | of 1909 |